Patented May 28, 1940

2,202,200

UNITED STATES PATENT OFFICE 2,202,200

PROCESS OF PRODUCING PATTERN EFFECTS ON TEXTILE FABRICS

Robert Haller, Riehen, near Basel, and Gustav Widmer, Basel, Switzerland, assignors, by mesne assignments, to Ciba Products Corporation, Dover, Del., a corporation of Delaware No Drawing. Application January 26, 1938, Serial No. 187,094. In Switzerland January 30, 1937

3 Claims. (Cl. 8—115)

The present invention concerns a process for producing pattern effects on a transparent ground. It comprises the step of printing a fabric with a resist and passing it through an agent which produces transparency.

The characteristic feature of the process consists in using a resist which contains a potentially reactive aldehyde condensation product of an aminotriazine.

It is known that a transparent appearance can be imparted to fabrics made of cotton, artificial silk from regenerated cellulose, natural silk or the like by exposing them at a low temperature to the action of a concentrated mineral acid, for instance sulfuric acid, phosphoric acid, hydrochloric acid, nitric acid, or of an alkali solution, a zinc chloride solution or the like. It is also known that pattern effects on a transparent ground can be obtained either by printing concentrated sulfuric acid of 45–55° Bé. on a cotton fabric or by printing with a resist and passing the fabric through sulfuric acid so as to parchmentise the non-reserved portions of the fabric.

These transparent effects are emphasised for example in cotton by a combination of an alkali treatment with an acid treatment; for example by mercerising the cotton before or after the action of the acid or by repeated alternate treatments with mineral acid and alkali solution or by alternate treatment with cold caustic soda solution (under 0° C.) and with mercerising solution at ordinary temperature. For the purpose of stabilising the swelling effect of the concentrated mineral acid and restraining the hydrolytic degradation of the cellulose, it has been recommended to add to the liquor a salt of pyridine or of a homologue or derivative thereof.

Another proposition for producing pattern effects on fabrics of cellulose fibers consists in printing on the fabric a solution of a cellulose ester, for instance acetyl cellulose, in an organic solvent, for instance ethylenechlorhydrin, which solution has been mixed with a pigment such as barium sulfate, titanium white, a metal oxide or the like, and, after fixing this coating, subjecting the fabric to parchmentising. In this manner matt effects on a transparent ground are produced when titanium white is the pigment used. The use of strongly smelling organic solvents which are not without their effect upon health forms a serious disadvantage of this proposition.

The present invention is based on the observation that aldehyde condensation products from aminotriazines which are capable of being hardened are suitable either in the form of their soluble intermediate products or in the dispersed form for the production of pattern effects, for instance matt effects on the transparent ground. As examples of the condensation products in question there may be named the methylol compounds or the water-soluble primary condensation products of melamine; also hydrophobic melamine formaldehyde resins or the like. Instead of the finished condensation products their components may be used, in which case the condensation is completed on the fibers.

While the aldehyde condensation products of melamine have been found especially suitable for the purpose of the present process, there may also be used aldehyde condensation products of other aminotriazines, such as for instance of melam, of 2-chloro-4.6-diamino-1.3.5-triazine, of 2-hydroxy-4.6-diamino-1.3.5-triazine, and so on.

The fact that these products can be used in aqueous medium is both commercially and hygienically an essential progress as compared with the known methods which require the use of organic solvents.

The condensation products may be made into a paste, advantageously together with a suitable pigment and if desired with addition of a thickening agent such as tragacanth or British gum and the paste is then printed on the material. If desired, there may be added to the paste a substance which effects or accelerates the hardening or polymerization of the resin.

When the fabric has been printed it is passed in the usual manner through a bath to produce the transparent effect, consisting of a mineral acid or alkali solution, zinc chloride or the like of suitable concentration. It is then rinsed and dried. It then presents the desired pattern effect on the transparent ground.

As color substances there may be used inorganic pigments such as titanium white, barium sulfate, glass powder, metal powder, tungstates, chrome yellow, chrome green, ochre, umber, Prussian blue, soot; also organic insoluble pigment dyes belonging to the various classes of dyestuffs and also dyestuffs containing a metal, for instance chromium, copper or nickel in complex form, sulfur dyestuffs, vat dyestuffs, for instance indigoid or anthraquinone dyestuffs.

In selecting the pigment regard must be had to its stability under short action of a strong mineral acid or alkali solution.

The pigment may be coarsely dispersed, highly dispersed, or in colloidal dispersion, accordingly as matt effect or transparent effect is desired.

There may also be used as coloring substances certain soluble dyestuffs, for example those which, owing to affinity for condensation products capable of being hardened, have a tendency to become fixed with these products on the fiber.

If desired, softening agents may be used as assistants, for example olive oil, glycerine, paraffin oil, quaternary ammonium salts containing an aliphatic residue having more than 8 carbon atoms, for example the trimethylammonium salt of mono-stearyl-para-phenylenediamine. Furthermore, water-repellent substances such as paraffin wax, beeswax, resin or aluminium salts may be used.

Besides the aforesaid additions, others can be made which are usual in textile printing.

There may be incorporated with the fabric after the treatment for producing transparency an addition such as a softener which may be required for the purpose of producing a desired finish.

Both vegetable and animal fibers may be treated by the invention, for example native, regenerated or esterified cellulose, for instance cotton, linen, ramie, hemp, sisal, jute, coconut fibers, artificial silk, natural silk. In each case the material may be colored or non-colored.

The following examples illustrate the invention, the parts being by weight:

*Example 1*

A methylol compound of melamine is made in the following manner:

1 mol melamine is heated on the boiling water bath with 3.5 mols of a neutral aqueous formaldehyde solution of 32 per cent. strength by volume; when solution has occurred, the whole is immediately cooled in ice water. The methylol compound crystallizes, the whole becomes solid. This mass is broken into pieces and dried at 40° C. and then powdered. 1 part of this powder is dissolved in 2 parts of water. 350 parts of this solution are worked up into a printing paste with 350 parts of tragacanth $60/1000$, 200 parts of titanium white powder, 50 parts of alcohol and 50 parts of ethyl lactate.

Bleached cotton batiste is printed with this paste and then steamed for 5–8 minutes in a Mather-Platt apparatus and passed in the course of about 15 seconds at as low a temperature as is practicable through a sulfuric acid bath of 56° Bé. The cotton is then neutralized with a weak caustic soda solution, washed and dried. There is produced a matt effect on a transparent ground.

*Example 2*

A water-soluble primary condensation product of melamine is prepared as follows:

1 mol melamine is heated with 3 mols of neutral aqueous formaldehyde on the water bath at 80–90° C. until a sample becomes turbid when diluted with 5 times its volume of water.

The solution is dried on a steam-heated drying roller and the dry matter is powdered. 1 part of this powder is dissolved in 2 parts of water and 350 parts of this solution are worked up into a printing paste with 350 parts of British gum, 200 parts of barium sulfate, 50 parts of alcohol and 10 parts of ammonium sulfocyanide.

Mercerized cotton is printed with this paste and the fabric is then steamed and treated with concentrated sulfuric acid as described in Example 1. After neutralization with dilute alkali solution and thorough washing the goods are after-treated with caustic soda solution of 6° Bé. Both the sulfuric acid bath and the caustic soda solution are used in a cooled condition. The effect attained resembles that obtained in Example 1.

*Example 3*

A condensation product being unlimitedly soluble in water and alcohol is made as follows:

1 mol melamine is heated on the boiling water bath with 6 mols of aqueous formaldehyde until solution occurs and the whole is then cooled in ice water. The thus separated hexamethylol compound of the melamine is filtered and after drying dissolved in a reflux apparatus in the threefold quantity of methyl alcohol in the presence of about $1/100$ mol hydrochloric acid or an equivalent acid. As soon as solution has occurred, the same is neutralized with caustic soda solution up to the point where phenolphthalein shows a pink color. The solution is then evaporated to a thick sirup containing about 90 per cent. solid substance. The sirup is unlimitedly capable of being diluted with water and alcohol.

150 parts of this sirup are worked up into a printing paste with 150 parts of the dystuff made by condensation of 2 mols of 1-amino-4-methoxy-anthraquinone and 1 mol cyanuric chloride, 650 parts of tragacanth $60/1000$ and 50 parts of ammonium thiocyanate.

Bleached cotton batiste is printed with this paste and the printed fabric is treated as described in Example 1. There are obtained orange-dyed matt effects on a transparent ground.

The fabric after having been treated with sulfuric acid is neutralized with weak caustic soda solution may still be subjected, if desired, to a mercerization with caustic soda solution of 6° Bé.

*Example 4*

In the printing paste made according to Example 3 the dyestuff used is replaced by 130 parts of Milori Blue (cf. Colour Index No. 1288), 20 parts of titanium white.

Bleached cotton batiste is printed with this paste. The printed fabric is treated according to Example 1. There are thus obtained blue dyed matt effects on a transparent ground.

What we claim is:

1. In a process for producing pattern effects on a transparent ground by printing a fabric with a resist and passing it through an agent which produces transparency, the steps of printing the fabric with a resist containing, as the essential resist-producing ingredient, a heat reactive water-soluble aldehyde condensation product of an aminotriazine and fixing and insolubilizing said resist on the fiber by means of a hardening treatment.

2. In a process for producing pattern effects on a transparent ground by printing a fabric with a resist and passing it through an agent which produces transparency, the steps of printing the fabric with a resist containing, as the essential resist-producing ingredient, a heat reactive water-soluble formaldehyde condensation product of melamine and fixing and insolubilizing said resist on the fiber by means of a hardening treatment.

3. In a process for producing pattern effects on a transparent ground by printing a fabric with a resist and passing it through an agent which produces transparency, the steps of printing the fabric with a resist containing, as the essential resist-producing ingredient, a heat reactive aldehyde condensation product of an aminotriazine and fixing and completing the condensation of said resist on the fiber by means of a hardening treatment.

ROBERT HALLER.
GUSTAV WIDMER.